United States Patent [19]

Siemionko

[11] 4,370,466
[45] Jan. 25, 1983

[54] OPTICALLY ANISOTROPIC MELT FORMING POLYESTERS

[75] Inventor: Roger K. Siemionko, Newark, Del.

[73] Assignee: E. I. Du Pont de Nemours and Company, Wilmington, Del.

[21] Appl. No.: 306,592

[22] Filed: Sep. 28, 1981

[51] Int. Cl.³ ............................................ C08G 63/60
[52] U.S. Cl. .................................. 528/190; 528/193; 528/194; 528/271
[58] Field of Search ................ 528/190, 271, 193, 194

[56] References Cited

U.S. PATENT DOCUMENTS

| | | | |
|---|---|---|---|
| 3,637,595 | 1/1972 | Cottis | 528/193 |
| 4,083,829 | 4/1978 | Calundann et al. | 528/193 |
| 4,118,372 | 10/1978 | Schaefgen | 528/193 |
| 4,161,470 | 7/1979 | Calundann | 528/190 |
| 4,219,461 | 8/1980 | Calundann | 528/190 |
| 4,256,624 | 3/1981 | Calundann | 528/190 |
| 4,299,756 | 11/1981 | Calundann | 528/190 |

FOREIGN PATENT DOCUMENTS 139698 10/1979 Japan .................................. 528/193

Primary Examiner—Lester L. Lee

[57] ABSTRACT

Fiber-forming aromatic polyester consisting essentially of 1,4-dioxyphenylene units, isophthaloyl units, p-oxybenzoyl units and 6-oxy-2-naphthoyl units.

8 Claims, No Drawings

OPTICALLY ANISOTROPIC MELT FORMING POLYESTERS

BACKGROUND OF THE INVENTION

1. Field of the Invention

This invention relates to fiber-forming, melt-spinnable wholly aromatic copolyesters. The invention includes filaments and films prepared from optically anisotropic melts of the copolyesters. The filaments have high modulus and high tenacity after heat treatment.

2. Description of the Prior Art

Aromatic copolyesters containing units derived from 4-hydroxybenzoic acid, hydroquinone, and isophthalic acid have been disclosed in prior art, e.g., U.S. Pat. No. 3,637,595 and Japanese Patent Application Publication 139,698/79. Relatively high melting points are reported in such prior art. In the case where the units derived from 4-hydroxybenzoic acid constitute 40 mole % or more of the copolyester composition it is found that poor thermal stability at the high temperature and long exposure time required for melt processing lead to poor spinnability and frequent breaks of the filaments in the threadline.

Copolyesters containing units from 4-hydroxybenzoic acid, hydroquinone, isophthalic acid and 2,6-naphthalene dicarboxylic acid are disclosed in U.S. Pat. No. 4,083,829. A copolyester of units from 6-hydroxy-2-naphthoic acid, hydroquinone and terephthalic acid is exemplified in U.S. Pat. No. 4,256,624. The patent also discloses that isophthalic acid may be used, and up to 10 mole % of units from other arylhydroxy acids can be included in the polymer.

Lastly, U.S. Pat. No. 4,219,461 discloses copolyesters containing units derived from 4-hydroxybenzoic acid, 6-hydroxy-2-naphthoic acid, hydroquinone and terephthalic or other diacid having para-positioned chain extending links; it will be noted that relatively large amounts of 6-hydroxy-2-naphthoic acid are employed.

SUMMARY OF THE INVENTION

The present invention is directed to melt-spinnable copolyesters of fiber-forming molecular weight that exhibit optical anisotropy in the melt and consist essentially of Units I, II, and III and IV having the structural formulas:

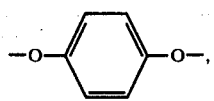  I

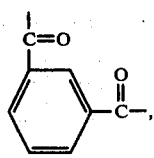  II

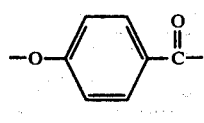  III and

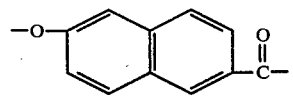  IV wherein said polyesters comprise at least about 10 mole % of Unit I, at least about 10 mole % of Unit II, from about 40 to 70 mole % of Unit III and from about 2.5 to 15 mole % of Unit IV. In each case the number of dioxy units in the polyester is substantially equal to the number of dicarbonyl units.

Melt-spun and heat-strengthened filaments of such polyesters are included in the invention.

DETAILED DESCRIPTION OF THE INVENTION

The copolyesters of the invention consist essentially of units I, II, III and IV. Unit I is 1,4-dioxyphenylene, and is provided by hydroquinone. Unit II is the isophthaloyl radical and is provided by isophthalic acid. Unit III is p-oxybenzoyl and is derived from 4-hydroxybenzoic acid. Unit IV is 6-oxy-2-naphthoyl and is derived from 6-hydroxy-2-naphthoic acid. Functional equivalents of the precursors may be employed.

The number of dioxy units, e.g., Unit I, present in the copolyester is substantially equivalent to the number of dicarbonyl units, e.g., Unit II. Mole % is calculated on the basis of total moles of units present, i.e. [I+II+III+IV].

The precursor reactants are generally combined in proportions corresponding to the molar proportions of the units desired in the copolyester products except that it is preferred to use up to 7 mole % excess, indicated in the examples as (7%) of the diacetate of hydroquinone.

It has been found that compositions of Units I, II and III wherein Unit III is present in excess of 50 mole % do not melt at conventional melt spinning temperatures. Even when the content of Unit III is reduced to as low as 40 mole %, excessively high temperatures must be employed in fiber processing which cause thermal stability problems. Poor spinning and excessive breaks result. The present invention overcomes these problems. Preferred compositions of the invention contain from about 60 to 70 mole % of Unit III for improved in-rubber stability as judged by filament stability to boiling 20% morpholine in toluene for three hours.

As compared with U.S. Pat. No. 4,219,461, much smaller amounts of the expensive component, 6-hydroxy-2-naphthoic acid, are used. This is an important advantage. If one were to use 6-hydroxy-2-naphthoic acid in the compositions of U.S. Pat. No. 4,219,461 at the low levels as used in the present invention, melt-spinnable compositions would not be obtained.

Conventional polymerization techniques may be employed such as described in the aforementioned U.S. Pat. No. 4,118,372 and more particularly in the examples described below. In general, a mixture of monomers is heated with stirring, under nitrogen in a 250 ml 3-necked flask or polymerization tube in a Wood's metal bath or other suitable heating medium from approximately 250° C. to 330°–380° C. Polymerization is continued for up to a total of 0.5 to one hour or longer if necessary until a polymer of fiber-forming molecular weight is obtained. Usually a vacuum is applied to obtain a final product with high molecular weight. The copolyesters of the invention exhibit optical anisotropy in the melt as described in the U.S. Pat. No. 4,118,372.

Filament Preparation

The polyesters of the invention are spun into filaments by conventional melt-spinning techniques without substantial degradation. In the examples below, filaments were prepared by melt-spinning into a quenching atmosphere of air or nitrogen and collected at a windup speed specified in the example. The spinneret employed had a single capillary (hole) shaped as a right circular cylinder 0.23 mm in diameter and usually 0.69 mm long. "Melt temperature" is the temperature at which the melt was maintained (values in parentheses are temperatures of the spinnerets). Melt pumping speed is adjusted to give the approximate linear density (D) shown in the tables at the stated windup speeds.

As used herein, the term "as-spun fiber" refers to a fiber which has not been drawn or heat treated after extrusion and normal windup.

Heat Treatment and Utility

Following collection, samples of undrawn (as-spun) monofilament were heat-treated in essentially relaxed condition in an oven as taught in Luise U.S. Pat. No. 4,183,895. Heating was in a nitrogen atmosphere with temperature increased in stages. Typically, temperature was raised from room temperature to 200° C. in 2 hours, then to 304° C. in another 7 hours, and finally maintained at 304° C. for an additional 7 hours. Such a heating sequence is abbreviated as RT-200° C./2 hr + 200°-304° C./7 hr + 304° C./7 hr The heat-treated fibers of this invention are useful for a variety of industrial applications such as in ropes and cables, and in reinforcement of plastic composites or of rubber as in tires and V-belts. The polymers of the invention are also useful for making films.

Test Methods

Inherent viscosity ($n_{inh}$) was computed from $$n_{inh} = \ln(n_{rel})/C$$

where $n_{rel}$ is the relative viscosity and C is a solution concentration in grams of polymer per deciliter of solvent. Relative viscosity is the ratio of polymer solution flow time to solvent flow time in a capillary viscometer at 30° C.

The polymers were characterized by "stick temperature" meaning the temperature of a thermal-gradient hot bar at the point at which the polymer first began to stick as it was pressed to the bar at progressively higher temperatures.

Monofilament tensile properties were measured using a recording stress-strain analyzer at 70° F. (21.1° C.) and 65% relative humidity. Gauge length was 1.0 in (2.54 cm), and rate of elongation was 10%/min. Results are reported as D/T/E/M or T/E/M where D is linear density in tex units, T is break tenacity in dN/tex, E is elongation-at-break expressed as the percentage by which initial length increased, and M is initial tensile modulus in dN/tex. Since linear density is normally substantially unchanged by heat-treatment, it is reported only for the as-spun filament. Average tensile properties for three to five filament samples are reported.

Fibers of this invention have high initial moduli (i.e., above 200 dN/tex) and high tenacity after heat-treatment.

EXAMPLES

The same general procedure was used in all the examples. It should be understood that the results reported below are believed to be representative and do not constitute all the runs involving the indicated reactants.

In the examples, the diacetate of the dihydric phenols and the monoacetates of the hydroxyaromatic acids were used. The isophthalic acid was used as such rather than as esters or other derivatives.

The monomer ingredients were added in substantially the same molar ratios as desired in the final polymer except that an excess (usually up to 7%) of acetylated dihydric phenol was generally used. The resultant polymer is identified, for example, as HQ/IA/2,6-HNA/4HBA (20/20/10/50) meaning monomer ingredients were added to yield polymers containing 20 mole % of 1,4-dioxyphenylene units, 20 mole % of isophthaloyl units, 10 mole % of 6-oxy-2-naphthoyl units and 50 mole % of p-oxybenzoyl units.

The 3-necked flask or polymer tube was fitted with: (1) a glass stirrer extending through a pressure-tight resin bushing, (2) a nitrogen inlet, and (3) a short column leading to a water- or air-cooled condenser with a flask for collecting acetic acid by-product. An attachment for application of vacuum was provided at the end of the condenser. An electrically heated Wood's metal bath or a boiling liquid vapor bath mounted for vertical adjustment was used for heating. The reaction mixture was heated to increasing temperatures with stirring at atmospheric pressure under nitrogen purge until essentially all the acetic acid had evolved. Then, vacuum was applied and pressure was reduced gradually from atmospheric to less than 1 mm of mercury (133.3 Pa). Heating under vacuum at less than 1 mm mercury pressure was then continued until viscosity had increased to a level believed satisfactory for melt-spinning. The cooled and solidified polymer was comminuted, and a portion was molded into a cylindrical plug for melt spinning.

EXAMPLES 1-4

Filaments From Copolyesters of Hydroquinone (HQ), Isophthalic Acid (IA) 6-Hydroxy-2-Naphthoic Acid (2,6-HNA) and 4-Hydroxybenzoic Acid (4-HBA)

| | Polymerization Ingredients | | | | |
|---|---|---|---|---|---|
| | Grams | | | | Mole Ratios |
| Ex. | HQ | IA | 2,6HNA | 4HBA | HQ/IA/2,6HNA/4HBA |
| 1 | 8.9 (2%)* | 7.47 | 3.45 | 35.1 | 15/15/5/65 |
| 2 | 11.94 (7%)* | 9.55 | 1.15 | 14.4 | 28.75/28.75/2.5/40 |
| 3 | 10.38 (7%)* | 8.3 | 9.2 | 46.8 | 12.5/12.5/10/65 |
| 4 | 2.04 (5%)* | 1.66 | 3.45 | 11.71 | 10/10/15/65 |

| | Polymerization Temperatures | |
|---|---|---|
| Ex. | Atmospheric Pressure | Vacuum |
| 1 | 240-330° C./30 min. | 330-345° C./15 min. |
| 2 | 260-346° C./62 min. | 346-356° C./5 min. |
| 3 | 260-350° C./54 min. | 350-355° C./3 min. |
| 4 | 280-358° C./20 min. | 358-364° C./11 min. |

| | Polymer Characterization | |
|---|---|---|
| Ex. | Stick Temperature (°C.) | Inherent Viscosity (Solvent) |
| 1 | 290 | 1.30 (pentafluorophenol) |
| 2 | 273 | 0.85 (p-chlorophenol) |
| 3 | 250 | 2.45 (pentafluorophenol) |

-continued

Filaments From Copolyesters of Hydroquinone (HQ), Isophthalic Acid (IA) 6-Hydroxy-2-Naphthoic Acid (2,6-HNA) and 4-Hydroxybenzoic Acid (4-HBA)

| | | |
|---|---|---|
| 4 | 240 | — |

Filament Extrusion

| Ex. | Melt Temp (°C.) Cell (Spinneret) | Windup Speed (m/min) |
|---|---|---|
| 1 | 352 (356) | 205 |
| 2 | 313 (314) | 550 |
| 3 | 308 (310) | 550 |
| 4 | 322 (320) | 550 |

Heat Treatment

| Run | Cycle |
|---|---|
| 1 | RT-100° C./0.5 hr + 148° C./0.5 hr + 205° C./1 hr + 220° C./1 hr + 237° C./1 hr + 262° C./1 hr + 281° C./15 hr |
| 2 | RT-200° C./2 hr + 200-298° C./7 hr + 298° C./7 hr |
| 3 | RT-200° C./2 hr + 200-290° C./7 hr + 290° C./7 hr |
| 4 | RT-200° C./7 hr + 200-304° C./7 hr + 304° C./7 hr |

Tensile Properties

| Ex. | As-spun D/T/E/M | Heat-Treated T/E/M (dN/tex) |
|---|---|---|
| 1 | 1.46/2.0/0.9/206 | 12/2.9/370 |
| 2 | 0.71/2.8/1.9/173 | 19.4/6.7/288 |
| 3 | 0.76/4.7/1.8/350 | 18/4.7/376 |
| 4 | 0.8/3.8/1.3/329 | 12.9/4.1/309 |

*Percent excess

I claim:

1. Fiber-forming melt-spinnable copolyesters that exhibit optical anisotropy in the melt consisting essentially of Units I, II, III and IV having the structural formulas:

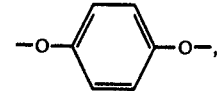

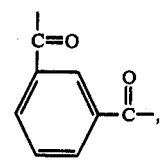

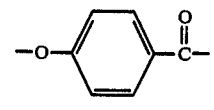

and

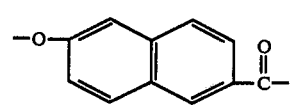

wherein said polyesters comprise at least about 10 mole % of Unit I, at least about 10 mole % of Unit II, from about 40 to 70 mole % of Unit III and from about 2.5 to 15 mole % of Unit IV, the number of dioxy units in the polyester being substantially equal to the number of dicarbonyl units.

2. A filament of a copolyester of claim 1.
3. Fiber-forming copolyester according to claim 1 wherein Unit III is present in the proportions of from about 60 to 70 mole %.
4. A filament of a copolyester of claim 3.
5. A film of a copolyester of claim 1.
6. A molded article of a copolyester of claim 1.
7. A film of a copolyester of claim 3.
8. A molded article of a copolyester of claim 3.

* * * * *